United States Patent [19]

Bäbler et al.

[11] Patent Number: 4,477,608
[45] Date of Patent: Oct. 16, 1984

[54] COMPOSITIONS CONTAINING GRAPHITE

[75] Inventors: Fridolin Bäbler, Marly, Switzerland; Adolf Weissmüller, Kandern, Fed. Rep. of Germany

[73] Assignee: Ciba-Geigy Corporation, Ardsley, N.Y.

[21] Appl. No.: 520,938

[22] Filed: Aug. 8, 1983

[30] Foreign Application Priority Data

Aug. 20, 1982 [CH] Switzerland ................. 4980/82

[51] Int. Cl.³ ............... C08K 3/04; C08K 9/04
[52] U.S. Cl. ..................... 523/215; 252/512; 524/83; 524/88; 524/358; 524/402; 524/406; 524/407; 524/410; 524/413; 524/419; 524/420; 524/431; 524/435; 524/443; 524/512; 524/567; 524/580; 524/589; 524/611; 524/612
[58] Field of Search ............... 524/88, 512, 496, 495, 524/431, 407, 443, 413, 410, 402, 420, 419, 406, 435, 611, 589, 567, 612, 584, 358, 580, 83; 252/512; 523/215

[56] References Cited

U.S. PATENT DOCUMENTS

| | | | |
|---|---|---|---|
| 2,875,076 | 2/1959 | Suchow | 106/148 |
| 3,089,849 | 5/1963 | Linson | 252/511 |
| 3,099,578 | 7/1963 | Hunter | 252/511 |
| 3,247,159 | 4/1966 | Pendleton et al. | 524/496 |
| 3,446,769 | 5/1969 | Opipari | 524/512 |
| 3,671,476 | 6/1972 | Terai et al. | 524/512 |
| 3,901,840 | 8/1975 | Irvin et al. | 524/512 |
| 3,907,717 | 9/1975 | Hebert | 252/508 |
| 3,960,790 | 6/1976 | Khanna | 523/174 |
| 3,985,661 | 10/1976 | Ikeda et al. | 252/12 |
| 4,017,448 | 4/1977 | Panush | 524/88 |
| 4,250,242 | 2/1981 | Doering | 430/141 |
| 4,267,229 | 5/1981 | Knight et al. | 524/88 |
| 4,276,212 | 6/1981 | Khanna et al. | 524/512 |
| 4,358,510 | 11/1982 | Ito et al. | 524/512 |

FOREIGN PATENT DOCUMENTS

| | | | |
|---|---|---|---|
| 2345460 | 3/1975 | Fed. Rep. of Germany | 524/495 |
| 0158643 | 12/1975 | Japan | 524/496 |
| 2044780 | 10/1980 | United Kingdom | 524/512 |
| 0668934 | 6/1979 | U.S.S.R. | 524/88 |
| 0855740 | 8/1981 | U.S.S.R. | 252/511 |

OTHER PUBLICATIONS

Encyclopedia of Polymer Sci. & Tech., vol. 10, John Wiley, New York (1969), pp. 193–209.
Derwent Abst. 51395 E/25 (5-1982) Chugoku J57078464.
Derwent Abst. 12877 E/07 (1-1982) Dainippon Printing J57003870.
Derwent Abst. 23218 E/12 (2-1982) Horino K. J57028175.
Derwent Abst. 82828 A/46 (10-1978) Toyota Motor J53115757.
Derwent Abst. 15991 K/07 (1-1983) Matsushita J58001833.
Derwent Abst. 16251 K/07 (1-1983) Matsushita J58003135.
Derwent Abst. 67337 Y/38 (8-1975) Teuin KK J50110474.
Derwent Abst. 39130 B/21 (3-1979) Rother J. DL-134777.
S. B. Seeley, Graphite, Pigment Handbook, vol. 1, New York, 1973, pp. 745–756.
I. Drogin, Color Engineering, 5, 20 (1967).

Primary Examiner—Herbert J. Lilling
Attorney, Agent, or Firm—Luther A. R. Hall

[57] ABSTRACT

Compositions containing high-molecular, organic material which can be processed into moulded products, 0.001 to 3.0% by weight of graphite, relative to the high-molecular, organic material, and one or more pigments or polymer-soluble dyes, are suitable for producing moulded products.

9 Claims, No Drawings

COMPOSITIONS CONTAINING GRAPHITE

It has been found that in the dyeing of plastics with a pigment of dye, homogeneous, evenly glistening and novel shades of colour having excellent fastness properties can be obtained by the addition of a specific amount of graphite. The addition of graphite is very economical, toxicologically safe and impairs neither the resistance to heat nor the fastness to light and to weather of the composition. Graphite is very readily dispersible in plastics substances and in no way has it a decomposing action on these substances.

The invention relates thus to a composition containing high-molecular organic material which can be processed into moulded products, 0.001 to 3.0% by weight of graphite, relative to the high-molecular organic material, and one or more pigments or polymer-soluble dyes.

By moulded products are meant in particular injection-moulded parts, cast components, pressed articles, ribbons, fibres and rolled sheets. High-molecular organic materials which can be processed into moulded products can be especially thermoplasts, duroplasts or elastomers, such as cellulose ethers, cellulose esters, for example ethyl cellulose, polyamides, polyethers, linear or crosslinked polyurethanes, linear, crosslinked or unsaturated polyesters, polycarbonates, polyolefins, such as polyethylene, polypropylene, polybutylene, polystyrene, poly-p-xylylene, poly-4-methylpentene-1, polysulfones, polycyclamides, polyphenylene oxides, ionomers, phenoxy resins, also polyvinyl halides, such as polyvinyl chloride, polyvinylidene chloride or -fluoride, polytetrafluoroethylene, polyimides, polyacrylonitrile, acrylic polymers, polyacrylates, rubber, silicone polymers, phenol formaldehyde resins, melamine formaldehyde resins, urea formaldehyde resins, epoxy resins, styrene-butadiene rubber, acrylonitrile-butadiene rubber or chloroprene rubber, singly or in mixtures.

The compositions according to the invention preferably contain thermoplastic high-molecular organic material, particularly polyvinyl chloride, polyethylene, polypropylene, polystyrene, polycarbonate, polyacrylic acid ester, polyamide, linear polyesters, polyethers, linear polyurethane, or copolymers thereof.

When the composition according to the invention contains a polymer-soluble dye, there is used as high-molecular, organic material in particular a transparent thermoplastic, for example polystyrene, polymethylmethacrylate or polycarbonate.

Graphites suitable for the composition according to the invention are both natural and synthetic graphites. In the case of natural graphites, the percentage of carbon can vary greatly. Preferred natural graphites however are those of which the carbon content is at least 70%. The impurities present in natural graphite, such as silicic acid, alumina or iron oxides, can be tolerated only to the extent that they do not unfavourably affect the stability of the substrate to be dyed or the fastness properties of the other pigment or dye present. Graphites which are preferred are as a rule those having a high carbon content, particularly one of at least 99%. Synthetic graphites are therefore as a rule preferred.

With regard to the nature of the particles of the graphite, crystalline graphite having a particle diameter of in particular less than 100 $\mu$m is preferred. A graphite which is in flake- or lamella-form with a diameter of up to 20 $\mu$m and a thickness of up to 4 $\mu$m is especially preferably used.

The optimum optical effects can be determined by variation of the amount of graphite within the given range. An amount of 0.01 to 1.0% by weight of graphite, relative to the high-molecular, organic material in the composition according to the invention, is preferably used. The amount which suffices particularly in the case of graphite particles having a diameter of less than 5 $\mu$m is as a rule less than 0.5% by weight.

Suitable pigments which can be used besides the graphite are transparent or opaque inorganic and/or organic compouds. Examples of inorganic pigments are: metal oxides, such as titanium oxide, iron oxide, antimony yellow, lead chromates, molybdenum red, ultramarine blue, cobalt blue, manganese blue, chromium oxide green, hydrated chrome oxide green, cobalt green, also metal sulfides, such as cadmium sulfide, zinc sulfide, arsenic disulfide, mercury sulfide, antimony trisulfide, cadmium sulfoselenides and metal powders, such as zinc or aluminium powder.

Examples of organic pigments are: azo, azomethine, methine, anthraquinone, phthalocyanine, perinone, perylene, dioxazine, thioindigo, iminoisoinodoline, iminoisoindolinone, quinacridone or quinophthalone pigments; also metal complexes, for example azo, azomethine or methine dyes.

Suitable polymer-soluble dyes are for example in particular: disperse dyes, preferably those of the anthraquinone series, for example hydroxy-, amino-, alkylamino-, cyclohexylamino-, arylamino-, hydroxyamino- or phenylmercaptoanthraquinones; and also metal complexes of azo dyes, especially 1:2-chromium or -cobalt complexes of monoazo dyes; also fluorescent dyes, such as those of the coumarin, naphthalimide, pyrazoline, acridine, xanthene, thioxanthene, oxazine, thiazine or benzothiazole series.

The compositions according to the invention preferably contain, besides the graphite, one or more organic pigments or one or more dyes, especially however just one organic pigment or just one dye. Particularly preferably, the compositions according to the invention contain, in addition to the graphite, an organic pigment, especially a transparent organic pigment.

In the composition according to the invention, the pigments or dyes present, besides the graphite, are preferably in amounts of 0.001 to 10% by weight, in particular 0.01 to 3% by weight, relative to the amount of high-molecular organic material.

Graphite in the preferred condition with respect to the particles can be obtained in the known manner, starting with coarse-crystalline graphite, for example by grinding in air-jet, sand or ball mills. The graphite is comminuted however preferably under such conditions in which the anisotropic properties of the graphite come into play with respect to the cleaveability of the layers. There are thus obtained well defined flat, lamella- or flake-like graphite particles, for example by wet-grinding coarse-crystalline graphite in a grinding device containing, as grinding elements, metal, glass or porcelain balls, plastics granules or sand grains. These grinding elements are set into motion for example by rotation of the vessel, by an oscillation generator or by a stirrer.

It can be of advantage to treat the pigment, dye and/or graphite with a texture preservative before they are used for the composition according to the invention. A graphite which has been treated with a texture preservative, for example before, during or after comminution, is preferred. Relative to the employed amount of graphite, the amount of texture preservative preferably used is 0.02 to 25% by weight.

Suitable texture preservatives are for example fatty acids having at least 12 C atoms, such as stearic acid or behenic acid, or amides, salts or esters thereof, such as magnesium stearate, zinc stearate, aluminium stearate or magnesium behenate, also quaternary ammonium compounds, such as tri-($C_1$-$C_4$)-alkylbenzylammonium salts, also plasticisers, such as epoxidised soyabean oil, waxes, such as polyethylene wax, resinic acids, such as abietic acid, rosin soap, hydrogenated or dimerised colophonium, $C_{12}$-$C_{18}$-paraffin disulfonic acids, alkylphenols, alcohols, diols or polyols having at least 8 C atoms.

The composition according to the invention contains preferably a graphite treated with stearic acid, stearylamine, hydrogenated abietic acid, epoxidised soyabean oil or a 1,2-diol, especially with octanediol-(1,2) or dodecanediol-(1,2).

The compositions according to the invention can be produced by known methods. Graphite and pigment or dye can be added individually, or premixed as toners or as solution or dispersion, or in the form of preparations, to the high-molecular organic material. There can also be added, depending on the purpose of application of the composition according to the invention, further substances, for example light stabilisers, heat stabilisers, plasticisers, binders or fillers.

A uniform gleaming lustre, as is characteristic for silk fabrics, is obtained using the finely crystalline flake- or lamellar-like graphite particles in the composition according to the invention. The silky lustre is particularly distinct when the composition according to the invention is irradiated by direct light from an artificial source or by sunlight. By virtue of their strongly marked diffused scattered-light component, the lustre effects obtained according to the invention can be clearly distinguished from those achieved in any other manner. The lustre effects can be measured for example with a goniophotometer.

The use of graphite for the composition according to the invention is economical. The resistance of graphite itself, and likewise of the composition according to the invention, to heat, light and weather is excellent; furthermore, graphite can be very readily incorporated into the carrier material. In the extrusion operation, for example, there is negligible wear of the apparatus and very little braking effect. In plasticiser pastes and plastisols, the graphite, as a result of its ideal density, does not settle out even after prolonged standing, and, above all, level dyeings are obtained.

The compositions according to the invention are suitable for producing moulded products, for example injection-moulded, rolled or extruded plastics articles, for example in the household goods, building, motor-car and aviation industries.

Where not otherwise stated in the following Examples, the term 'parts' denotes parts by weight.

EXAMPLE 1

(a) In a glass-bead mill having a capacity of 500 parts by volume, 13.5 parts of synthetic LONZA graphite T-44 ® having a mean particle size of less than 44 μm, and 1.5 parts of octanediol-(1,2) are stirred into 125 parts of water. To the suspension are added 400 parts by volume of glass balls each having a diameter of 3.5–4.0 mm, and the mixture is ground for 9 hours, without external cooling, at a stirring rate of 320 r.p.m. The graphite suspension is separated from the glass balls, which are subsequently washed to some extent, and then filtered off. The press cake is washed with water and dried at 70°–80° C. in a vacuum drying chamber. There are thus obtained 14.0 parts of a grey graphite containing octanediol-(1,2) as texture preservative, which graphite, after being comminuted, can be readily incorporated, by virtue of its fully satisfactory dispersibility, into plastics mixtures. Raster electron microscopic photographs of the graphite powder treated in the described manner show particles having a marked flake-like to lamellar appearance.

(b) 63.0 parts of polyvinyl chloride LONZAVYL E 722 ® (LONZA AG), 3.0 parts of REOPLAST 39 ® (CIBA-GEIGY AG), 1.5 parts of IRAGASTAB BC-26 ®, 0.5 part of IRGASTAB CH-300 (both CIBA-GEIGY AG), 32.0 parts of dioctyl-phthalate, 0.25 part of the graphite treated according to Example Ia) and 0.25 part of C.I.Pigment BLAU (blue) 15:3, No. 74160 are well mixed together by hand with a stirring rod in a beaker. The mixture is then rolled out on a two-roller laboratory mixing rolls for 8 minutes by continual removal, reversal and feeding-in again, at a temperature of 160° C., a rotary speed of 25 r.p.m. and a friction of 1:1.2, into the form of a soft PVC sheet having a thickness of about 0.4 mm. The soft PVC sheet thus obtained displays a deeply coloured, uniformly silky-lustrous blue dyeing having excellent fastness to heat, light and migration.

(c) Measurement of the lustre effect with a goniophotometer TYP GP2 (ZEISS):

angle of illumination: 60°
illumination aperture: 1°
scale sensitivity: 0.25 μA
measuring error: ±0.3 μA
sheet thickness: 0.4 mm, measurement of the glossy surface in the longitudinal direction.

| Measuring angle | Measured results Measuring aperture | Sheet according to Example Ib. [μA] |
| --- | --- | --- |
| 63° | 2° | 7.2 |
| 64° | 2° | 4.4 |
| 65° | 2° | 3.1 |

EXAMPLE 2

(a) By proceeding in a manner analogous to that described in Example 1b but using C.I. Pigment Rot (red) 221 instead of C.I. Pigment Blau 15:3, No. 74160, there is obtained a deeply coloured, full, evenly silky-lustrous, reddish-violet sheet having equally good properties.

(b) When the lustre effects are measured as described in Example 1c, the following values are obtained:

| Measuring angle | Measuring aperture | Sheet according to Example 2a [μA] |
| --- | --- | --- |
| 63° | 2° | 6.8 |
| 64° | 2° | 4.5 |
| 65° | 2° | 3.1 |

EXAMPLE 3

When the procedure is carried out in a manner analogous to that described in 1b, except that C.I. Pigment Gelb 128 (yellow) is used in place of C.I. Pigment Blau 15:3, there is obtained an opaque, evenly silky-lustrous, green-dyed sheet having very good fastness to heat, light and weather.

(b) When the lustre effects are measured in the manner described in Example 1c, the following results are obtained:

| Measuring angle | Measuring aperture | Sheet according to Example 3a [µA] |
| --- | --- | --- |
| 63° | 2° | 7.8 |
| 64° | 2° | 5.4 |
| 65° | 2° | 4.2 |

EXAMPLE 4

By carrying out the procedure in a manner analogous to that described in Example 1b but using the isoindolinone pigment C.E. Pigment Gelb 110 (yellow) in place of C.I. Pigment Blau 15:3, there is obtained a soft PVC sheet displaying a greenish, evenly silky-lustrous dark dyeing having excellent fastness to light, heat, weather and migration.

EXAMPLE 5

(a) If the procedure is carried out in a manner analogous to that described in Example 1a except that 0.5 part of stearic acid is used instead of 1.5 parts of octanediol-(1,2), there are obtained 13 parts of a treated LONZA graphite having similarly good properties.

(b) When the procedure used is similar to that described in Example 1b with the exception that the dioxazine pigment C.I. Pigment Violett 37 (violet) is employed in place of C.I. Pigment Blau 15:3, and graphite treated according to Example 5a is used instead of that treated according to Example 1a, a soft PVC sheet having an evenly silky-lustrous, violet shade is obtained.

EXAMPLE 6

By proceeding in a manner analogous to that described in Example 5b but using the α-Cu-phthalocyanine pigment C.I. Pigment Blau 15 (blue) in place of C.I. Pigment Blau 15:3, there is obtained an evenly silky-lustrous, blue dyeing having excellent fastness to heat, light and migration.

EXAMPLE 7

When the procedure is carried out in a manner analogous to that described in Example 5b except that chlorinated Cu-phthalocyanine pigment C.I. Pigment Grün 7 (green) is used instead of C.I. Pigment Blau 15:3, there is obtained a soft PVC sheet displaying a level, deeply-coloured, silky-lustrous, dark-green shade. The fastness of this dyeing to heat, light and migration is excellent.

EXAMPLE 8

By carrying out the procedure in a manner analogous to that described in Example 5b but using 0.5 part of the opaque inorganic pigment Cadmopur Gelb GS® (BAYER) (yellow) in place of 0.25 part of C.I. Pigment Blau 15:3, there is obtained a soft PVC sheet displaying an evenly silky-lustrous, dark-green dyeing of high saturation.

EXAMPLE 9

(a) By proceeding in a manner analogous to that described in Example 1a but using finely divided, hydrogenated abietic acid instead of octanediol-(1,2), a treated LONZA graphite having similarly good properties is obtained.

(b) When the procedure is carried out in a manner analogous to that described in Example 1b except that 1.0 part of the yellow diazo-condensation pigment C.I. Pigment Gelb 94 (yellow) is used instead of 0.25 part of the C.I. Pigment Blau 15:3, and LONZA graphite treated according to Example 9a instead of that according to Example 1a, there is obtained a soft PVC sheet displaying a green, level, silky-lustrous, deeply-coloured dyeing having excellent fastness to heat, light and migration.

EXAMPLE 10

By proceeding in a manner analogous to that described in Example 9b but using 0.1 part instead of 0.25 part of the treated LONZA graphite, and 0.1 part of the anthraquinoid pigment C.I. Pigment Rot 177 (red) in place of 0.25 part of the C.I. Pigment Blau 15:3, there is obtained a deeply-coloured, evenly silky-lustrous, reddish-violet soft PVC sheet having excellent fastness to heat, light and migration.

EXAMPLE 11

When the procedure is carried out in a manner analogous to that described in Example 9b except that 0.5 part instead of 0.25 part of the treated LONZA graphite is used, and 1.0 part of the anthraquinoid pigment C.I. Pigment Rot 177 (red) in place of 0.25 part of the C.I. Pigment Blau 15:3, a soft PVC sheet displaying a silky-lustrous, deeply-coloured violet shade is obtained.

EXAMPLE 12

By proceeding in a manner analogous to that described in Example 9b but using 0.1 part instead of 0.25 part of the treated LONZA graphite, and 0.25 part of the indigoid pigment C.I. Pigment Rot 88 (red) in place of 0.25 part of the C.I. Pigment Blau 15:3, a soft PVC sheet displaying an evenly silky-lustrous, violet shade is obtained.

EXAMPLE 13

If the procedure carried out is analogous to that described in Example 9b except that 0.2 part instead of 0.25 part of the treated LONZA graphite is used, and 0.2 part of the red perylenetetracarboxylic acid diimide pigment C.I. Pigment Rot 149 (red) in place of 0.25 part of the C.I. Pigment Blau 15:3, there is obtained an evenly silky-lustrous, brownish-red soft PVC sheet having excellent fastness to heat, light and migration.

EXAMPLE 14

A mixture of

| | | |
| --- | --- | --- |
| 92.0 | parts of vinyl resin Vinnol H65D ® | (Wacker, Munich) |
| 8.0 | parts of vinyl copolymer Vestolit HIS 7587 ® | (HUELS) |
| 1.5 | parts of a plasticiser Reoplast 39 ® | (CIBA-GEIGY AG) |
| 1.4 | parts of the stabiliser IRGASTAB BC-10 ® | " |
| 1.4 | parts of the stabiliser IRGASTAB BC-29 ® | " |

| | | |
|---|---|---|
| 0.7 | part of the auxiliary stabiliser IRGASTAB CH-300 ® | " |
| 0.4 | part of the lubricant IRGAWAX 370 ® | " |
| 0.2 | part of the lubricant IRGAWAX 360 ® | " |
| 0.25 | part of the light stabiliser TINUVIN 320 ® | (CIBA-GEIGY AG) | is produced in a fluid mixer (Papenmeier K.G., Detmold) by stirring up for about 5 minutes at a speed of 1400 revs/minute.

1.5 parts of the hard PVC mixture thus produced, 0.05 part of a readily dispersible perylenetetracarboxylic acid-dianhydride pigment and 0.025 part of the LONZA graphite treated according to Example 9a are mixed in a Henschel mixer (Henschelwerke G.M.B.H., Kassel) at a speed of about 2000 r.p.m. for about 3 minutes at room temperature. The hard PVC mixture pigmented in this manner is rolled on mixing rolls at 190° C. for 6 minutes at 25 r.p.m. and a friction of 1:1.2, and then pressed at 190° C. for 6 minutes between chromium-plated steel sheets on a Bürkle press to a thickness of about 1 mm. There is thus obtained an evenly silky-lustrous, brownish-red-dyed moulded product having excellent fastness to light and to weather.

EXAMPLE 15

(a) When the procedure is carried out in a manner analogous to that described in Example 5a except that stearylamine is used instead of stearic acid, a treated LONZA graphite having similarly good properties is obtained.

(b) By carrying out the procedure in a manner analogous to that described in Example 1b but using 0.2 part of LONZA graphite treated according to Example 15a instead of 0.25 part of that treated according to Example 1a, and the inorganic pigment Moly Orange AA3 ® (CIBA-GEIGY AG) in place of 0.25 part of the C.I. Pigment Blau 15:3, a soft PVC sheet displaying an evenly silky-lustrous, brownish-red dyeing is obtained.

EXAMPLE 16

By carrying out the procedure in a manner analogous to that described in Example 15b but using 0.2 part instead of 0.25 part of the treated LONZA graphite, and 1.0 part of the inorganic iron oxide pigment Bayferrox 3910 ® (BAYER) in place of 0.25 part of the C.I. Pigment Blau 15:3, a silky-lustrous, greyish-green soft PVC sheet is obtained.

EXAMPLE 17

If the procedure is carried out in a manner analogous to that described in Example 15b except that 0.2 part instead of 0.25 part of the treated LONZA graphite is used, and 0.5 part of the orange perinone pigment C.I. Pigment Orange 43 in place of 0.25 part of C.I. Pigment Blau 15:3, there is obtained an evenly silky-lustrous, brown-dyed soft PVC sheet having excellent fastness to heat, light and migration.

EXAMPLE 18

By proceeding in a manner analogous to that described in Example 15b but using 0.2 part instead of 0.25 part of the treated graphite, and 0.5 part of γ-quinacridone pigment C.I. Pigment Violett 19 in place of 0.25 part of the C.I. Pigment Blau 15:3, there is obtained a soft PVC sheet displaying an evenly silky-lustrous, violet shade having excellent fastness properties.

EXAMPLE 19

When the procedure carried out is analogous to that described in Example 18 with the exception that the dichloroquinacridone pigment C.I. Pigment Rot 209 (red) is used instead of C.I. Pigment Violett 19, the result is a soft PVC sheet displaying an evenly silky-lustrous, violet shade having excellent fastness properties.

EXAMPLE 20

By carrying out the procedure in a manner analogous to that described in Example 18 but using the disazo-condensation pigment C.I. Pigment Rot 166 (red) instead of C.I. Pigment Violett 19, a soft PVC sheet displaying an evenly silky-lustrous, opaque, brown dyeing is obtained.

EXAMPLE 21

By proceeding in a manner analogous to that described in Example 20 but using 1.0 part instead of 0.5 part of C.I. Pigment Rot 166, there is obtained an evenly silky-lustrous, brownish-red dyeing having excellent fastness properties.

EXAMPLE 22

When the procedure is carried out in a manner analogous to that described in Example 21 except that the yellow quinophthalone pigment C.I. Pigment Gelb 138 (yellow) is used in place of C.I. Pigment Rot 166, there is obtained a soft PVC sheet displaying an evenly silky-lustrous, very opaque, green dyeing having excellent fastness properties.

EXAMPLE 23

By proceeding in a manner analogous to that described in Example 21 but using the red 2B toner C.I. Pigment Rot 48:4, No. 15865:4 instead of C.I. Pigment Rot 166, a soft PVC sheet having a dark-red silky-lustrous, strongly opaque shade is obtained.

EXAMPLE 24

If the procedure is carried out in a manner analogous to that described in Example 21 except that the yellow diarylide pigment C.I. Pigment Gelb 13, No. 21100 is used in place of C.I. Pigment Rot 166 a soft PVC sheet displaying a silky-lustrous, strongly opaque, green dyeing is obtained.

EXAMPLE 25

By proceeding in a manner analogous to that described in Example 3 but using 100% LONZA graphite of the type KS 2.5 ® instead of the treated LONZA graphite containing octane-diol-(1,2), a soft PVC sheet dyeing in a greenish shade and having similar properties is obtained.

EXAMPLE 26

When the procedure is carried out in a manner analogous to that described in Example 25 except that 0.5 part of LONZA graphite T-10 ® is used instead of 0.25 part of LONZA graphite KS 2.5 ®, a soft PVC sheet dyed in a greenish shade and having similar properties is obtained.

EXAMPLE 24

By carrying out the procedure in a manner analogous to that described in Example 26 but using the natural graphite 'Silberpudergraphit'GHL 1701 ® (Georg H. Luh) in place of the LONZA graphite T-10 ®, a soft PVC sheet dyed in a greenish shade and having similar properties is obtained.

EXAMPLE 28

(a) When the procedure is carried out in a manner analogous to that described in Example 1a except that 0.9 part of REOPLAST 39 ® (CIBA-GEIGY AG) is used instead of 1.5 parts of octanediol-(1,2), a treated LONZA graphite having similarly good properties is obtained.

(b) A mixture of 0.5 part of the LONZA graphite treated according to Example 28a, 0.5 part of the isoindolinone pigment C.I. Pigment Gelb 110 (yellow), 1.0 part of the antioxidant IRGANOX 1010 ® (CIGA-GEIGY AG) and 1000 parts of the polyethylene-HD granulate VESTOLEN A6016 ® (Hüls) is premixed for 15 minutes in a glass bottle on a rolling device. The mixture is subsequently extruded in two passes on a single-shaft extruder; the resulting granulate is injection moulded at 220° C. on an injection-moulding machine (Allround Aarburg 200) into the form of plates, and these are afterwards pressed at 180° C. for 5 minutes. The pressed plates display a silky-lustrous, dark-green dyeing having excellent fastness properties.

EXAMPLE 29

When the procedure is carried out in a manner analogous to that described in Example 28b except that the anthraquinoid pigment C.I. Pigment Rot 177 is used instead of C.I. Pigment Gelb 110, pressed plates having a silky-lustrous, violet shade and equally good fastness properties are obtained.

EXAMPLE 30

By carrying out the procedure in a manner analogous to that described in Example 28b but using 1000 parts of polystyrene granulate, Polystyrol 165 H ® (BASF) instead of 1000 parts of VESTOLEN A6016 ®, and 0.25 part in place of 0.5 part of graphite, and copper phthalocyanine-tetrasulfonic acid-(3-methoxypropyl)-amide instead of C.I. Pigment Gelb 110, there are obtained moulded products displaying a silky-lustrous, dark-blue shade and having excellent fastness properties.

EXAMPLE 31

A mixture of 0.25 part of the LONZA graphite treated according to Example 28a, 0.5 part of copper phthalocyanine-tetrasulfonic acid-(3-methoxypropyl)-amide, 1.0 part of the antioxidant IRGANOX 1010 ® (CIBA-GEIGY AG) and 1000 parts of polycarbonate MACROLON 3000W ® (BAYER) is preliminarily mixed for 15 minutes in a glass bottle on a rolling device. The mixture is afterwards extruded in one pass on a single-shaft extruder, and then granulated. The granulate thus obtained is injection-moulded, on an injection-moulding machine at 290° C. with a holding time of 5 minutes, into the form of moulded plates 1.5 mm thick. The pressed plates display a silky-lustrous blue shade having excellent fastness properties.

EXAMPLE 32

When the isoindolinone pigment C.I. Pigment Gelb 110 is used in place of copper phthalocyanine-tetrasulfonic acid-(3-methoxypropyl)-amide, the procedure otherwise being as described in Example 31, there are obtained pressed plates having a silky-lustrous, dark-green shade and excellent fastness properties.

EXAMPLE 33

When the anthraquinoid Pigment C.I. Pigment Red 177 is used instead of copper phthalocyanine-tetrasulfonic acid-(3-methoxypropyl)-amide, and 0.5 part in place of 0.25 part of graphite, the procedure being otherwise as described in Example 31, there are obtained moulded products displaying a silky-lustrous, brownish-black shade and having excellent fastness properties.

EXAMPLE 34

By using polyamide granulate VESTAMID ® (Hüls) in place of MACROLON 3000W ®, the process otherwise being carried out in the manner described in Example 31, dyed polyamide moulded products having similarly good properties are obtained.

EXAMPLE 35

When polypropylene granulate MOPLEN S50G ® (Montedison) is used in place of VESTOLEN A6016 ®, the procedure otherwise being as described in Example 28b, dyed polypropylene moulded products having similarly good properties are obtained.

EXAMPLE 36

A mixture of 0.25 parts of the LONZA graphite treated according to Example 28a, 0.5 part of C.I. Solvent Orange 60, 1.0 part of the antioxidant IRGANOX 1010 ® and 1000 parts of polycarbonate granulate MACROLON 3000W ® (BAYER) is premixed for 15 minutes in a glass bottle on a rolling device. The mixture is then extruded in one pass on a single-shaft extruder and granulated. The dyed granulate obtained is subsequently injection-moulded on an injection-moulding machine, with a holding time at 290° C. of 5 minutes, into the form of moulded plates 1.5 mm thick. The plates display a silky-lustrous brown shade having excellent fastness properties.

EXAMPLE 37

When the quinophthalone dye C.I. Dispersions-Gelb 54 is used instead of C.I. Solvent Orange 60, the procedure being otherwise carried out in the manner described in Example 36, moulded plates displaying a green, silky-lustrous shade having good fastness properties are obtained.

EXAMPLE 38

By using the anthraquinoid dye C.I. Dispersions Violett 31 in place of C.I. Solvent Orange 60, and carrying out the procedure otherwise in the manner described in Example 36, there are obtained moulded plates displaying a dark-violet, silky-lustrous shade having excellent fastness properties.

EXAMPLE 39

When the fluorescent thioxanthene dye C.I. Solvent Orange 63 is used instead of C.I. Solvent Orange 60, and only 0.05 part instead of 0.25 part of graphite, the procedure otherwise being as described in Example 36, moulded plates displaying a brilliant, silky-lustrous, orange shade are obtained.

EXAMPLE 40

By using the fluorescent coumarin dye C.I. Solvent Gelb 160 (yellow) in place of C.I. Solvent Orange 63, and carrying out the procedure otherwise in the manner described in Example 39, moulded products displaying a brilliant, greenish, silky-lustrous shade are obtained.

EXAMPLE 41

When 0.03 part of the fluorescent thioindigo dye is used in place of 0.05 part of C.I. Solvent Orange 63, the procedure otherwise being carried out in the manner described in Example 39, moulded products displaying a brilliant violet, silky-lustrous shade are obtained.

EXAMPLE 42

When 100% LONZA graphite of the type KS 2.5 is used in place of the LONZA graphite treated according to Example 9a, the procedure otherwise being carried out in the manner described in Example 12, a violet sheet having similar properties is obtained.

EXAMPLE 43

When 100% LONZA graphite of the type KS 2.5 is used instead of the LONZA graphite treated according to Example 15a, the procedure otherwise being carried out in the manner described in Example 18, a sheet dyed in a violet shade and having similar properties is obtained.

EXAMPLE 44

By using 100% LONZA graphite of the type KS 2.5 instead of the LONZA graphite treated according to Example 15a, the procedure otherwise being carried out in the manner described in Example 24, a sheet dyed in a greenish shade and having similar properties is obtained.

What is claimed is:

1. A composition, which can be processed into moulded products, which comprises
   (a) a thermoplastic high-molecular organic material selected from the group consisting of polyvinyl chloride, polyethylene, polypropylene, polystyrene, polycarbonate, polyacrylate, linear polyester, polyether, linear polyurethane and copolymers thereof,
   (b) 0.001 to 3.0% by weight, relative to the high-molecular organic material, of graphite of a particle diameter of less than 100 microns, and
   (c) 0.001 to 10.0% by weight, relative to the high-molecular organic material, of one or more organic pigments; polymer-soluble dyes; or inorganic pigments selected from the group consisting of iron oxide, antimony yellow, lead chromates, molybdenum red, ultramarine blue, cobalt blue, manganese blue, chromium oxide green, hydrated chrome oxide green, cobalt green, cadmium sulfide, zinc sulfide, arsenic disulfide, mercury sulfide, antimony trisulfide and cadmium sulfoselenides.

2. A moulded product produced from the composition according to claim 1.

3. A composition according to claim 1, wherein the graphite has a carbon content of at least 99%.

4. A composition according to claim 1, wherein the graphite is present in flake- or lamellar-form having a diameter of up to 20 $\mu$m and a thickness of up to 4 $\mu$m.

5. A composition according to claim 1, wherein the amount of graphite is 0.01 to 1.0% by weight, relative to the high-molecular organic material.

6. A composition according to claim 1, wherein the pigment is an organic pigment.

7. A composition according to claim 1, wherein the pigment is a transparent organic pigment.

8. A composition according to claim 1, wherein the dye is an anthraquinone dye or a metal complex of an azo dye.

9. A composition according to claim 1, wherein graphite treated with stearic acid, stearylamine, hydrogenated abietic acid, epoxidised soyabean oil or a 1,2-diol is present.

* * * * *